United States Patent Office 3,238,721
Patented Mar. 8, 1966

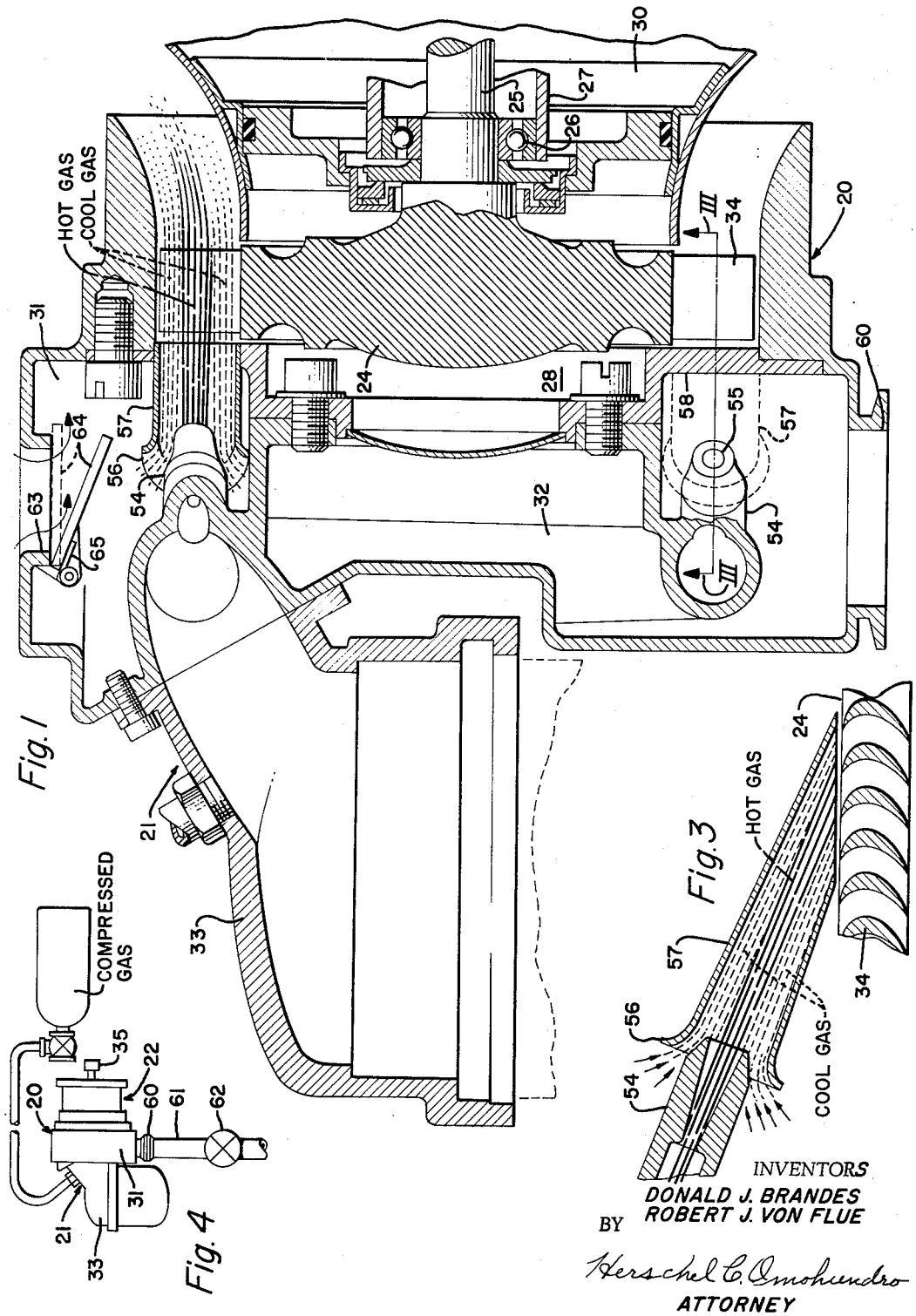

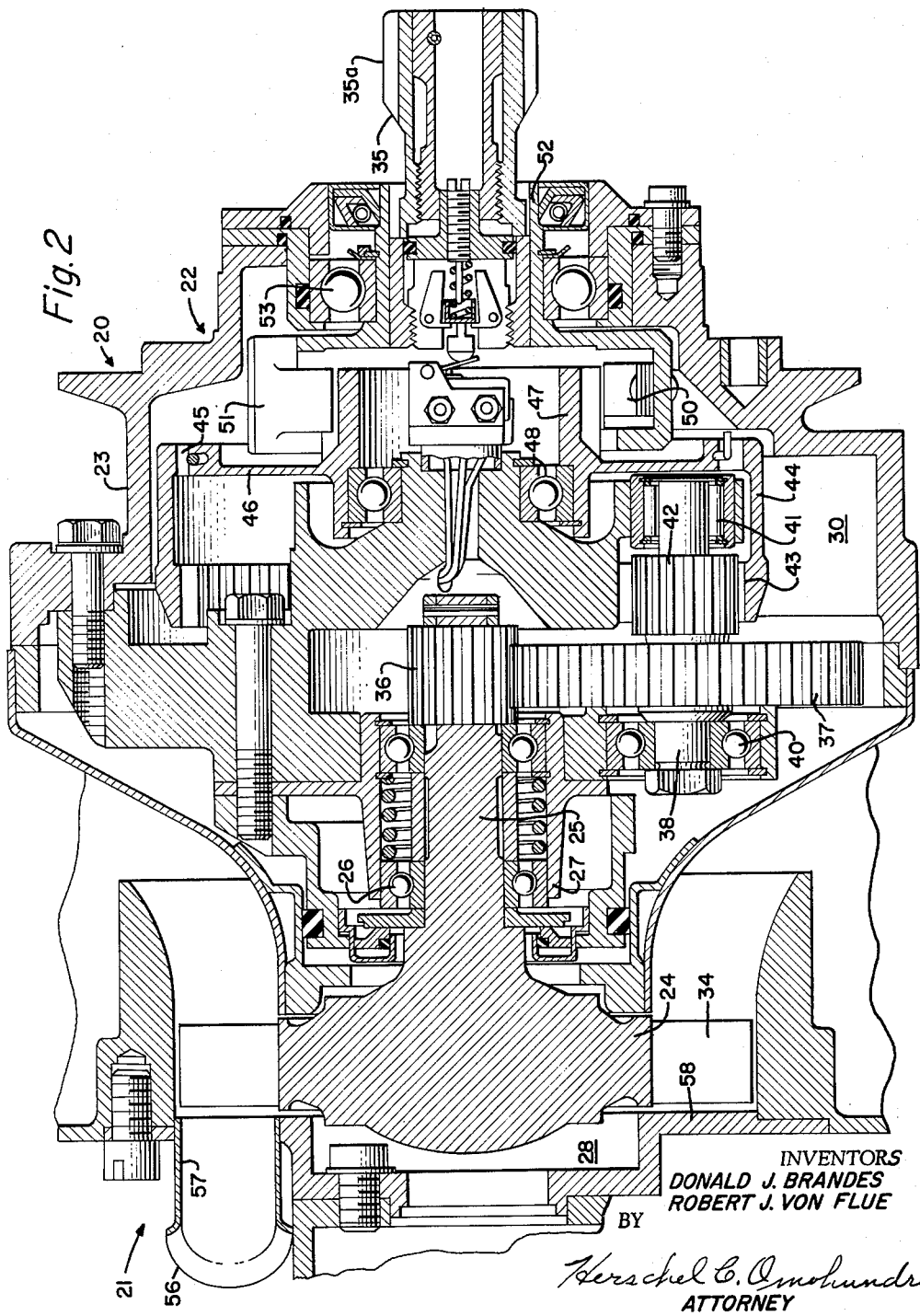

3,238,721
ENGINE STARTER
Donald J. Brandes, Scottsdale, and Robert J. Von Flue, Phoenix, Ariz., assignors to The Garrett Corporation, Los Angeles, Calif., a corporation of California
Filed July 2, 1962, Ser. No. 206,840
12 Claims. (Cl. 60—39.75)

This invention relates generally to engine starting mechanisms, and more particularly to starters of the type utilizing hot gases to drive a turbine wheel which is suitably coupled, through a torque-multiplying transmission, with a rotatable member of an engine, especially a gas turbine engine.

Still more particularly, the invention relates to engine starters which utilize stored energy of either the combustible, gas-generating type, or the compressed gas type, the starters having means in the form of nozzles for directing the gases against blades on a turbine wheel to convert the potential energy stored in the gases into kinetic energy.

More specifically, the invention relates to engine starters of the so-called self-contained, stored-energy type which are provided with means for receiving and burning a solid propellant in the form of a cartridge to generate hot motivating gases, the invention having as one of its objects the provision of means for adding cooler gases to the generated gases in such a way as to protect the turbine from injurious effects of the hot gases and yet detract as little as possible from the effectiveness of the hot gases.

Another object is to construct the cool-gas-adding means mentioned in the preceding paragraph in such a way that either stored energy in the form of noncombustible gases or gases compressed by suitable mechanism may be employed to drive the turbine to provide usable power.

Another object of the invention is to provide an engine starter having a turbine wheel adapted to be connected with an engine to be started and means for receiving and burning a cartridge to generate gases which are then directed through nozzle mechanisms against the turbine wheel blades, the nozzle mechanisms including primary nozzle sections through which the cartridge gases pass and secondary nozzle sections so constructed and arranged relative to the primary nozzles that ambient air will be caused to surround the gas streams and impinges against the turbine wheel blades, the ambient air adding weight to the motivating gases and cooling parts of the blades adjacent to those directly in the path of the hot gases.

Another object of this invention is to provide an engine starter having a bladed trubine wheel and means for receiving and burning a cartridge to generate gases, the starter having a manifold for receiving the gases and a plurality of primary nozzles projecting from the manifold toward the blades on the turbine wheel, secondary nozzles having open inlet ends surrounding and spaced from the discharge ends of the primary nozzles and outlet ends disposed adjacent the blades on the turbine wheel, gas flow from the manifold through the primary nozzles at high velocity drawing ambient air into the secondary nozzles and surrounding the hot gas streams with a layer of cooler gas which serves to maintain the wheel blades within safe temperatures.

A still further object of the invention is to provide a starter mechanism which may make use of cartridges which generate gases of at least 1000 p.s.i. and 2000° F. temperature, such gases being employed to pump air by the ejection method with a minimum loss of efficiency, the air being employed to extend the useful life of the mechanism by reducing or preventing blade damage.

An object also is to provide an engine starter of the type having a turbine for translating stored energy into kinetic energy and means for supplying the energy in the form of gases to the turbine, such means including inner and outer manifolds with a plurality of nozzles leading from the manifolds to direct gases from the manifolds against the blades of the turbine, the nozzles of one manifold being of the sonic or supersonic type and disposed to discharge gases through the nozzles of the other manifold, such gaseous discharge serving to induce the flow of gases from the latter manifold through the respective nozzles and form a surrounding layer of gases around the jets issuing from the first nozzles, cartridge burning means being provided in connection with the first manifold to supply hot gases thereto, other means being provided to conduct either ambient atmospheric air or other suitably compressed gases to the second or outer manifold. In some instances the compressed air or other gases may be employed in the absence of the cartridge gases to effect the operation of the turbine.

With the above-recited and other objects in mind, which will be obvious from the description, the invention consists in the novel features of construction and combinations of elements shown in the accompanying drawings and more particularly described in the following part of this specification.

In the drawings:

FIG. 1 is a fragmentary axial sectional view taken through the rear-end portion of a gas turbine starter embodying the present invention;

FIG. 2 is a similar view of the forward portion of the starter shown in FIG. 1;

FIG. 3 is a detail sectional view taken through a nozzle and turbine wheel mechanism used in the starter, the plane of the section being indicated by the line III—III of FIG. 1; and FIG. 4 is a schematic view of the starter and a duct for supplying it with compressed fluid from a suitable source.

Referring more particularly to the drawings an especially to FIG. 2 thereof, the numeral 20 designates the starter in its entirety. This starter basically includes two main sections 21 and 22, the section 21 including a gas turbine and means for supplying it with gas, the section 22 including a torque-amplifying transmission which is driven by the turbine and transmits the torque to the engine to be started. This invention is directed more particularly to the gas turbine section 21, and, while a transmission section of a particular type has been illustrated, any suitable torque amplifying transmission may be employed.

In general, the sections 21 and 22 are contained within a housing 23 which may be composed of a number of castings and sheet metal portions suitably formed to contain the various starter parts.

The turbine section in the preferred form of the invention includes a turbine wheel 24 which has a stub shaft 25 projecting from one side thereof. This shaft is supported for rotary movement in a pair of ball bearings 26 mounted in a frame portion 27 of the housing. This frame portion, together with other sheet metal parts, divides the housing into the turbine wheel and transmission chambers 28 and 30, the stub shaft of the turbine wheel extending into the latter chamber.

The casing of the starter also provides a first manifold 31 for receiving air at ambient atmospheric pressure, or air or other gases at super atmospheric pressures. The casing is also provided with a second manifold 32, disposed within the first, and a cartridge receiving and burning breech mechanism 33, the outlet of which communicates with the second manifold.

As shown in FIGS. 1, 2 and 3, the turbine wheel 24 has a plurality of circumferentially spaced, radially extending blades 34 on its periphery, these blades being curved in transverse cross section to provide buckets or suitable gas receiving passages. Gas flow impinging on or passing between the blades causes rotation of the turbine wheel, this rotary movement being transmitted through the transmission to an output shaft 35 at the forward end of the starter, which shaft is formed for connection to a part of the engine to be started.

As previously pointed out, the transmission may be of many different kinds. The form of transmission illustrated includes a pinion 36 secured to the end of the turbine wheel stub shaft 25 and arranged in meshing engagement with one or more planet gears 37. Each planet gear is provided with a shaft 38 mounted for rotary movement in bearings 40 and 41 supported in parts of the starter frame or casing. The shafts 38 are also provided with pinions 42 which are of smaller pitch diameter than the gears 37 and are arranged in meshing engagement with an internal ring gear 43, this gear being carried by a tubular body member 44. This body member is splined as at 45 to a disc element 46 projecting from a sleeve 47 which is journaled in an antifriction bearing 48. The sleeve member 47 forms a part of a one-way clutch 50. A second member 51 of the clutch surrounds one end of the sleeve 47 and a tubular extension 52 thereof is journaled in an antifriction bearing 53 supported in the casing 23. The output shaft 35 is splined or otherwise secured for rotation with the extension 52. Shaft 35 is also splined as at 35a for connection with the engine to be started.

It will be obvious from the foregoing brief description of the transmission that when pinion 36 is revolved, rotary motion will be transmitted through the gearing, and the one-way clutch to the output shaft 35, and due to the difference in pitch diameters of the pinions, the gears 37, and the ring gear, the torque delivered by the pinion 36 will be amplified and transmitted to the engine to be started by the output shaft 35. After the engine starts, the one-way clutch 50 will permit the shaft 35 and parts directly connected thereto to rotate while the remaining parts of the starter are stationary.

To impart rotary movement to the turbine wheel, the gas generating and applying mechanism has been provided. The gas delivered from the breech 33 to the second manifold 32 is directed against the blades of the turbine wheel through a plurality of supersonic nozzles 54 which project from the second manifold toward the turbine wheel blades, the nozzles being disposed at an acute angle of approximately 20° to the plane of rotation of the turbine wheel. This angular relationship is shown more particularly in FIG. 3. The nozzles 54 are formed integrally with, or suitably secured to, the manifold 32 to be supported in spaced relation from the turbine wheel blades, the spacing being such that the streams of gases issuing from the nozzles will have an insufficient time to spread to any great degree before impinging on the turbine wheel blades.

It will be noted from FIG. 1 that the axes or center lines of the nozzles are arranged substantially midway of the height of the turbine wheel blades. This location has been selected for a purpose which will be set forth hereinafter.

As shown in FIGS. 1 and 3, the nozzles 54 have their outlet ends 55 disposed within the flared inlet ends 56 of the secondary nozzles or ejector tubes 57, these tubes being supported in the manifold 31 by a wall 58 suitably secured to a portion of the starter frame. The longitudinal axes of the secondary nozzles are in alignment with the axes of the primary nozzles 54 so that the streams of gases flowing from the latter will be directed through the secondary nozzles before impinging on the turbine wheel blades. This flow of gases induces a flow of air or other gas from the first or outer manifold 31 to the turbine wheel blades. As previously mentioned, the nozzles 54 are so located that a minimum mixture of gases and air will take place as these fluids flow through the secondary nozzles 57. From FIG. 3 it will be seen that the secondary nozzles terminate in closely spaced relation to the side of the turbine wheel 24. Since the axes of the nozzles 57 are inclined at an acute angle to the plane of rotation of the wheel, the outlet ends of such nozzles are cut off at an angle to dispose them closely adjacent the wheel blades. FIG. 1 shows that the diameter or transverse dimension of the outlet end of each secondary nozzle is substantially equal to the length or height of the turbine wheel blades. All of the fluid flowing from the nozzles will thus be directed against the blades to effect wheel rotation.

It has been pointed out that one of the objectives of this invention is to provide the streams of hot gases with a surrounding layer of cooler air or other gases. These streams of gases will thus have a core of high temperature surrounded by a layer of cooler gases. The arrangement of the primary nozzles pointed out above will thus locate the streams of hot gases at points intermediate the height of the turbine wheel blades, while cooler gases will impinge on the root and tip portions of such blades. Due to the circumferential spacing of the nozzles 54, the points on the wheel engaged by the hot gases will also be spaced circumferentially of the wheel; therefore, as the wheel rotates, the blades will alternately pass through the hot gases and regions of cooler gases located therebetween. This alternate engagement of the blades with the hot and cool gases will permit the use of maximum temperature gases and yet maintain the blades at safe operating temperatures. By keeping the wheel blades at a relatively cool temperature, the blades are prevented from eroding as is customary when cartridge gases are used without a cooling medium. The life of the wheel will thus be prolonged. The effective life of the starter will also be extended.

The cartridges utilized in the operation of the starter may be designed to produce extremely high gas pressures of the order of 1000 p.s.i. or higher. These gases may also reach or exceed temperatures of 2000° F. The induction of the secondary air extracts very little if any force from the hot gas streams; therefore, no power is sacrificed.

This starter has been designed for dual operation; that is, the turbine may be driven by the cartridge gases supplemented by secondary air, as above described, or it may be driven by air or gas under pressure from any suitable source, such as bottled air or gases, another engine, or a ground cart having a suitable compressor. Bottled gases will also be of pressures equal to or higher than those produced by the cartridges. Such bottled gases, therefore, are conducted to the manifold 32 and issue from the nozzles 54. These gases serve, as the cartridge gases, to induce a flow of ambient air through secondary nozzles 57 and thus increase the weight flow of air applied to the turbine wheel. To effect operation when air under pressure from another engine or a ground cart is supplied, the first or outer manifold 31 is provided with an inlet 60 to which may be connected a duct 61 leading from such ground cart or other engine. This duct is provided with a suitable valve 62 to control the flow of compressed air to the manifold 31. The manifold is also provided with another inlet 63 which is provided, in this instance, with a flap-type valve 64. This valve may be normally urged toward an open position by a light spring 65, which will permit the valve to close when the compressed air is supplied to the manifold 31. During use of the cartridge or bottled gases, the open inlet 63 permits ambient air to flow, without substantial restriction, to the secondary nozzles or ejector tubes.

It will be obvious that a plurality of ports 63 and check valves 64 may be employed if desired. These check valves will close when air under pressure is supplied to the manifold through the duct 61, and such air will flow through the secondary nozzles and be directed against the turbine wheel blades to effect rotation of the turbine. Thus, air under pressure from any suitable source may be utilized to effect the opeartion of the starter without requiring cartridge gases. It should be obvious that by supplying air under pressure to the manifold the turbine may be employed as an auxiliary power device to drive an electrical generator or any other power operated mechanism.

We claim:
1. A gas turbine engine starter comprising:
 (a) a casing;
 (b) a turbine wheel supported for rotary motion in said casing, said wheel having circumferentially spaced blades and being adapted for connection with an engine to be started;
 (c) a first means adjacent said casing and turbine wheel for receiving and burning a cartridge to generate high temperature gases; and
 (d) a second means communicating with said first means and a relatively cool gas source, said second means being disposed relative to said turbine wheel to direct streams of the hot gas surrounded by a layer of cooler gas against the blades of said turbine wheel at a plurality of points spaced circumferentially of the wheel.

2. A gas turbine engine starter comprising:
 (a) a casing;
 (b) a turbine wheel supported for rotary motion in said casing, said wheel having circumferentially spaced blades and being adapted for connection with an engine to be started;
 (c) means adjacent said casing for receiving and burning a cartridge to generate gases;
 (d) a plurality of jet nozzles communicating with said cartridge burning means to receive said gases, said nozzles being disposed to direct streams of said gases against the blades on said wheel at points spaced circumferentially thereon; and
 (e) means disposed adjacent said jet nozzles and communicating with the ambient atmosphere, said means being responsive to gas flow from said jet nozzles to surround the jet streams of gas with fluid at a temperature lower than that of the gas to prevent the tip and root portions of said blades from reaching excessive temperatures.

3. A gas turbine engine starter comprising:
 (a) a casing;
 (b) a turbine wheel supported for rotary motion in said casing, said wheel having circumferentially spaced blades and being adapted for connection with an engine to be started;
 (c) means adjacent said casing for receiving and burning a cartridge to generate gases;
 (d) a plurality of jet nozzles communicating with said cartridge burning means to receive said gases, said nozzles being disposed to direct said gases angularaly against the blades on said wheel at points spaced circumferentially thereon, the diameter of the outlets of said jet nozzles being a fraction of the height of said blades and the centers of said outlets being directed toward points on said blades intermediate the height thereof; and
 (e) means communicating with a relatively cool gas source and disposed adjacent said jet nozzles and responsive to gas flow therefrom for surrounding the jets of gas with fluid at a temperature lower than that of the gas to prevent the tip and root portion of said blades from reaching excessive temperatures.

4. A gas turbine engine starter comprising:
 (a) a casing;
 (b) a turbine wheel supported for rotary motion in said casing, said wheel having circumferentially spaced blades projecting radially therefrom and being adapted for connection with an engine to be started;
 (c) means adjacent said casing for receiving and burning a cartridge to generate gases;
 (d) a plurality of jet nozzles communicating with said cartridge burning means to receive said gases, said nozzles being disposed to direct said gases angularly against the blades on said wheel at points spaced circumferentially thereon, the diameter of the outlets of said jet nozzles being a fraction of the height of said blades and the centers of said outlets being directed toward points on said blades intermediate the height thereof; and
 (e) an ejector tube surrounding and spaced from each jet nozzle, said ejector tubes being open to the ambient atmosphere at the inlet ends and having the outlet ends disposed adjacent the blades on said wheel, the cross-sectional width of said ejector tubes being substantially equal to the height of said blades, said ejector tubes serving to surround the jets of gas with fluid at a temperature lower than that of the gas to prevent the tip and root portions of said blades from reaching excessive temperatures.

5. A gas turbine engine starter comprising:
 (a) a casing;
 (b) a turbine wheel supported for rotary motion in said casing, said wheel having circumferentially spaced blades projecting radially therefrom and being adapted for connection with an engine to be started;
 (c) means adjacent said casing for receiving and burning a solid propellant to generate gases;
 (d) a ring-shaped manifold communicating with said propellant receiving and burning means to receive gases generated therein;
 (e) a plurality of jet nozzles projecting from said manifold at points spaced circumferentially thereof, said jet nozzles being spaced a limited distance from and directed toward the blades on said wheel, said nozzles being inclined at an angle to the plane of rotation of said wheel; and
 (f) an ejector tube surrounding the outlet end portion of each nozzle, said ejector tubes being open to the ambient atmosphere around said nozzles and serving to surround the jets of gas issuing from the nozzles with fluid at a temperature lower than that of the gas to prevent the tip and root portions of said blades from reaching excessive temperatures.

6. A gas turbine engine starter comprising:
 (a) a casing forming a turbine wheel chamber and a manifold at one side thereof, said manifold having an inlet for ambient air;
 (b) a turbine wheel supported for rotary motion in said turbine wheel chamber, said wheel having a plurality of spaced blades thereon and being adapted for connection with an engine to be started;
 (c) means forming a second manifold within said first-mentioned manifold;
 (d) a plurality of nozzles projecting from said second manifold toward the blades on said turbine wheel and terminating at a distance therefrom limited to prevent substantial spreading of gas streams issuing from the nozzles;
 (e) a plurality of secondary nozzles in axial registration with the first-mentioned nozzles, said secondary nozzles having open inlet ends communicating with said first-mentioned manifold, the inlet ends of said secondary nozzles being disposed in spaced surrounding relationship with the outlet ends of the first-mentioned nozzles, the outlet ends of said secondary nozzles terminating adjacent the blades on said turbine wheel; and
 (f) means adjacent said casing for receiving and burning a solid propellant to generate gases, said means communicating with said second manifold.

7. A gas turbine engine starter comprising:
(a) a casing forming a turbine wheel chamber and a manifold at one side thereof, said manifold having inlet means;
(b) means for selectively connecting said manifold inlet means with the ambient atmosphere and a source of fluid under pressure;
(c) a turbine wheel supported for rotary motion in said turbine wheel chamber, said wheel having a plurality of spaced blades thereon and being adapted for connection with an engine to be started;
(d) means forming a second manifold within said first-mentioned manifold;
(e) a plurality of nozzles projecting from said second manifold toward the blades on said turbine wheel and terminating at a distance therefrom limited to prevent substantial spreading of gas streams issuing from the nozzles;
(f) a plurality of secondary nozzles in axial registration with the first-mentioned nozzles, said secondary nozzles having open inlet ends communicating with said first-mentioned manifold, the inlet ends of said secondary nozzles being disposed in spaced surrounding relationship with the outlet ends of the first-mentioned nozzles, the outlet ends of said secondary nozzles terminating adjacent the blades on said turbine wheel; and
(g) means adjacent said casing for receiving and burning a solid propellant to generate gases, said means communicating with said second manifold.

8. A gas turbine engine starter comprising:
(a) casing means forming a turbine wheel chamber and a manifold separated from said wheel chamber by a wall, said manifold communicating with the ambient atmosphere;
(b) a plurality of tubes projecting from said wall into said manifold and establishing communication between said manifold and said wheel chamber;
(c) means adjacent said casing means for receiving and burning a cartridge to generate gases;
(d) a plurality of jet nozzles in said manifold and communicating with said gas generating means, said jet nozzles being disposed in circularly spaced order around an axis with the outlet ends thereof within and spaced from the walls of said tubes; and
(e) a turbine wheel supported in said wheel chamber for rotary motion about said axis, said wheel having circumferentially spaced blades and being adapted for connection with an engine to be started, the wheel being so disposed that upon rotation thereof said blades successively pass the openings in said wall provided by said tubes, the distance between said blades and the outlet ends of said jet nozzles being limited to prevent substantial spreading of gas streams issuing from the nozzles, said streams causing a flow of fluid from the first-mentioned manifold into said wheel chamber.

9. A gas turbine engine starter comprising:
(a) casing means forming a turbine wheel chamber and a manifold separated from said wheel chamber by a wall, said manifold having inlet means, a portion of which communicates with the ambient atmosphere;
(b) a plurality of tubes projecting from said wall into said manifold and establishing communication between said manifold and said wheel chamber, the ends of said tubes in the manifold being flared;
(c) means adjacent said casing means for receiving and burning a cartridge to generate gases;
(d) a plurality of jet nozzles communicating with said gas generating means, said jet nozzles being disposed in said manifold in circularly spaced order around an axis with the outlet ends of the nozzles within and spaced from the walls of the flared ends of said tubes;
(e) a turbine wheel supported in said wheel chamber for rotary motion about said axis, said wheel having circumferentially spaced blades and being adapted for connection with an engine to be started, the wheel being so disposed that said blades successively pass the openings provided by said tubes, the distance between said blades and the outlet ends of said jet nozzles being limited to prevent substantial spreading of gas streams issuing from the nozzles, said streams causing a flow of fluid from said manifold into said wheel chamber; and
(f) selectively actuated means for establishing communication between said manifold and a source of fluid pressure and interrupting communication between said manifold and the ambient atmosphere.

10. A gas turbine engine starter comprising:
(a) casing means forming a turbine wheel chamber and a manifold separated from said wheel chamber by a wall, said manifold having inlet means, a portion of which communicates with the ambient atmosphere;
(b) a plurality of tubes projecting from said wall into said manifold and establishing communication between said manifold and said wheel chamber, the ends of said tubes in the manifold being flared;
(c) means adjacent said casing means for receiving and burning a cartridge to generate gases;
(d) a plurality of jet nozzles communicating with said gas generating means, said jet nozzels being disposed in said manifold in circularly spaced order around an axis with the outlet ends of the nozzles within and spaced from the walls of the flared ends of said tubes;
(e) a turbine wheel supported in said wheel chamber for rotary motion about said axis, said wheel having circumferentially spaced blades and being adapted for connection with an engine to be started, the wheel being so disposed that said blades successively pass the openings provided by said tubes, the distance between said blades and the outlet ends of said jet nozzles being limited to prevent substantial spreading of gas streams issuing from the nozzles, said streams causing a flow of fluid from said manifold into said wheel chamber; and
(f) selectively actuated means for establishing communication between said nozzles and a second high pressure source.

11. A gas turbine engine starter comprising:
(a) casing means forming a turbine wheel chamber and a manifold separated from said wheel chamber by a wall, said manifold having inlet means, a portion of which communicates with the ambient atmosphere;
(b) a plurality of tubes projecting from said wall into said manifold and establishing communication between said manifold and said wheel chamber, the ends of said tubes in the manifold being flared;
(c) means adjacent said casing means for receiving and burning a cartridge to generate gases;
(d) a plurality of jet nozzles communicating with said gas generating means, said jet nozzles being disposed in said manifold in circularly spaced order around an axis with the outlet ends of the nozzles within and spaced from the walls of the flared ends of said tubes;
(e) a turbine wheel supported in said wheel chamber for rotary motion about said axis, said wheel having circumferentially spaced blades and being adapted for connection with an engine to be started, the wheel being so disposed that said blades successively pass the openings provided by said tubes, the distance between said blades and the outlet ends of said jet nozzles being limited to prevent substantial spreading of gas streams issuing from the nozzles, said streams causing a flow of fluid from said manifold into said wheel chamber;

(f) selectively actuated means for establishing communication between said nozzles and a second high pressure source; and (g) a second selectively actuated means for establishing communication between said manifold and a source of fluid pressure and interrupting communication between said manifold and the ambient atmosphere.

12. A gas turbine engine starter comprising:

(a) casing means forming a turbine wheel chamber and a manifold separated from said wheel chamber by a wall, said manifold having inlet means, a portion of which communications with the ambient atmosphere;

(b) a normally open valve element for closing said portion of the inlet means to interrupt communication between said manifold and the ambient atmosphere;

(c) tube means projecting from said wall into said manifold and establishing communication between said manifold and said wheel chamber at a plurality of circularly spaced points;

(d) means adjacent said casing means for receiving and burning a cartridge to generate gases;

(e) a plurality of jet nozzles in said manifold and communicating with said gas generating means, said jet nozzles being disposed in alignment with said tube means with the outlet ends of the nozzles located within and spaced from the walls of said tube means;

(f) a turbine wheel supported in said wheel chamber for rotary motion about an axis extending through the center about which said tubes are spaced, said wheel having circumferentially spaced blades and being adapted for connection with an engine to be started, the wheel being so disposed that said blades successively pass the openings provided by said tubes, the distance between said blades and the outlet ends of said jet nozzles being limited to prevent substantial spreading of gas streams issuing from the nozzles, said streams causing a flow of fluid from said manifold through said tubes into said wheel chamber; and (g) selectively actuated means for establishing communication between said manifold and a source of fluid pressure and moving said normally open valve element to a closed position to interrupt communication between said manifold and the ambient atmosphere.

References Cited by the Examiner
UNITED STATES PATENTS

| | | | |
|---|---|---|---|
| 2,517,822 | 8/1950 | Anderson | 60—39.14 X |
| 2,851,853 | 9/1958 | Quick | 60—39.66 X |
| 2,913,872 | 11/1959 | Bloomberg | 60—39.14 |
| 2,941,790 | 6/1960 | Compton et al. | 60—39.14 X |
| 2,986,879 | 6/1961 | Volk | 60—39.14 |
| 3,009,320 | 11/1961 | Paiement | 60—39.14 |

DONLEY J. STOCKING, *Primary Examiner.*

JULIUS E. WEST, SAMUEL LEVINE, *Examiners.*